United States Patent [19]

Gray

[11] 4,045,718
[45] Aug. 30, 1977

[54] MULTIPLE WINDING MULTIPLE VOLTAGE ALTERNATOR ELECTRICAL SUPPLY SYSTEM

[75] Inventor: Alden J. Gray, Ashfield, Mass.

[73] Assignee: Maremont Corporation, Saco, Maine

[21] Appl. No.: 564,638

[22] Filed: Apr. 2, 1975

[51] Int. Cl.$^2$ .......................... H02J 7/14; H02M 7/00
[52] U.S. Cl. ........................................ 320/17; 307/16; 310/198; 320/64; 322/90
[58] Field of Search .................... 322/28, 90; 310/198; 320/15, 17, 64, 65, 61; 307/16

[56] References Cited

U.S. PATENT DOCUMENTS

| | | | |
|---|---|---|---|
| 1,313,227 | 8/1919 | Darker | 210/489 |
| 2,939,975 | 6/1960 | Richards | 310/131 |
| 3,020,466 | 2/1962 | Race | 322/28 |
| 3,134,038 | 5/1964 | Schilling | 310/156 |
| 3,160,772 | 12/1964 | Miron | 322/90 X |
| 3,206,610 | 9/1965 | Lovrenich | 290/38 |
| 3,267,353 | 8/1966 | Franklin | 322/90 |
| 3,467,845 | 9/1969 | Wesolowski | 310/198 X |
| 3,509,438 | 4/1970 | Kachuk | 310/66 X |
| 3,555,395 | 1/1971 | Beery | 320/46 |
| 3,667,025 | 5/1972 | Campbell et al. | 320/15 |
| 3,671,843 | 6/1972 | Huntzinger et al. | 320/15 |
| 3,710,226 | 1/1973 | Seike | 320/15 |
| 3,793,544 | 2/1974 | Baumgartner et al. | 322/90 X |
| 3,809,995 | 5/1974 | Hardin | 322/90 X |

*Primary Examiner*—Robert J. Hickey
*Attorney, Agent, or Firm*—Cushman, Darby & Cushman

[57] ABSTRACT

A multiple voltage electrical supply system continuously connected for individually charging a plurality of battery supplies continuously connected in series with one another to supply a plurality of load circuits having differing d.c. input voltage requirements and, typically, also having differing expected electrical power consumption rates. The system includes an alternator having electrically isolated generating windings disposed so as to insure that the magnetic flux linking each of the generating windings bears a substantially constant ratio to that linking the other of the generating windings. The exemplary embodiment has generating windings of different characteristic resistance per unit length such that there is an increased internal voltage drop in the winding intended to supply the lighter electrical load. The resultant voltage regulation characteristics are such that a single voltage regulator is sufficient to maintain both of the output voltages at a substantially constant predetermined ratio.

14 Claims, 7 Drawing Figures

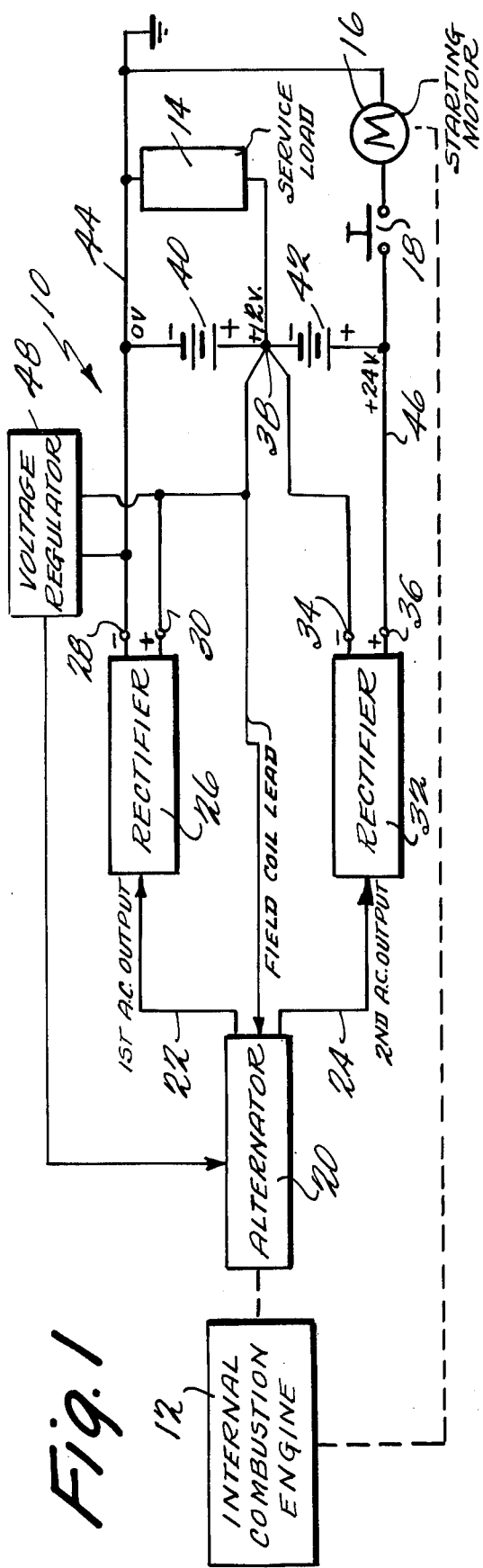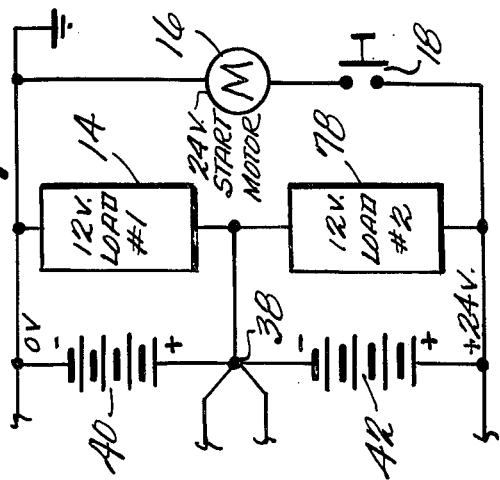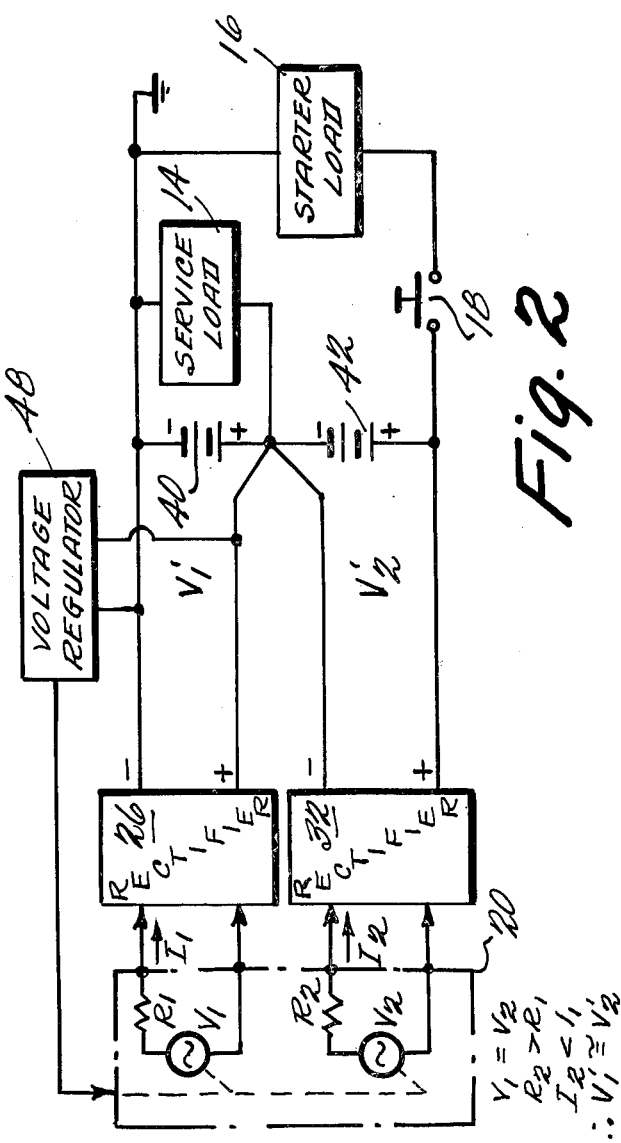

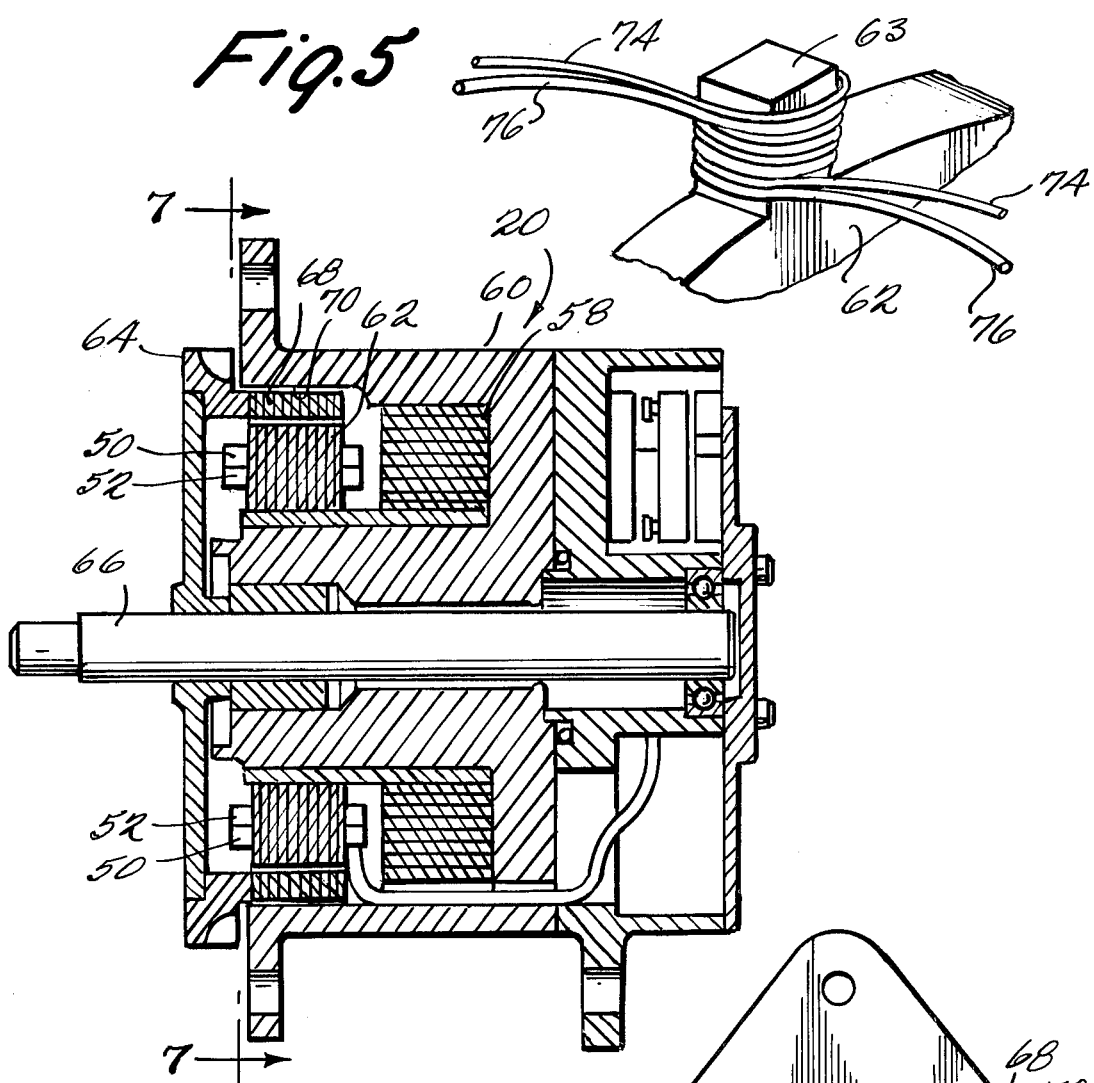
Fig. 5
Fig. 6
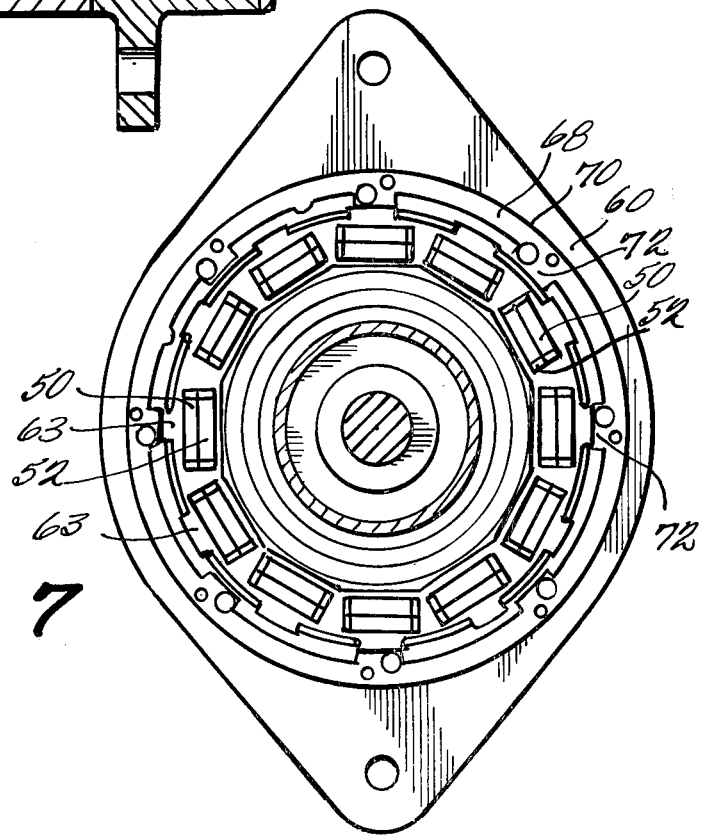
Fig. 7

MULTIPLE WINDING MULTIPLE VOLTAGE ALTERNATOR ELECTRICAL SUPPLY SYSTEM

This invention generally relates to a multiple voltage electrical supply system for supplying a plurality of d.c. voltages. More particularly, it relates to a multiple voltage electrical supply system of a type which is especially useful for individually charging a plurality of battery supplies in a vehicular or other electrical system associated with a prime mover (i.e. a stationary power plant) which requires a first d.c. operating voltage for a conventional "service load" (e.g. 12 volts for lighting, instrumentation, etc.) and a higher second d.c. voltage for operating a special load (e.g. 24 volts for a cranking motor). Typically, a single 12 volt battery or two series connected six volt batteries are utilized for supplying a twelve volt service load while two twelve volt batteries connected in series or four six volt batteries connected in series are utilized for supplying the 24 volt starter motor circuitry. The 12 volt service load may, of course, be supplied by two or more battery supplies connected in parallel if desired.

Such dual voltage electrical systems have been used in some types of vehicles for many years as the required cranking power for starting such vehicles has increased. For a time, such requirements for a dual voltage vehicle electrical system were minimized by attempts to design higher powered output 12 volt starting motors. However, for various reasons, there now appears to be an even greater demand for higher voltage cranking motors and, as a consequence, the resulting dual voltage vehicular electrical system.

Of course, the battery supply of d.c. voltage for such dual voltage systems must be replenished by a suitable battery charging arrangement which, in turn, obtains its energy input from a prime mover such as an internal combustion engine which is often the same prime mover as that utilized by the vehicle for locomotion. As will be appreciated by those in the art, it is desirable to provide a single alternator or generator structure and to have that single alternator or generator structure properly charge all of the batteries in the system so as to maintain a required dual voltage supply for the service load and the starting motor.

The most common practice in the past has been to provide a so-called "series-parallel" switch arrangement whereby two twelve volt battery supplies are normally connected in parallel for charging by a twelve volt supply of charging current from an alternator or a generator structure driven by the prime mover. The service load would, of course, also be connected across the normally parallel connected batteries. However, in a starting switch position, the "series-parallel" switch would reconnect the batteries in series with the starter motor circuit so as to supply that circuit with a higher 24 volts. As is recognized in the art, there are many practical maintenance problems with such "series-parallel" switches in part because of mechanical complexities of the switch, mechanical wear, and the high electrical cranking currents that must be carried by the electrical contacts of such a switch, etc.

Accordingly, there have been a number of prior suggestions for achieving the desired dual voltage system without using the "series-parallel" switch wherein the two twelve volt batteries involved in the dual voltage system are permanently connected in series with one another and charged by a generating system driven by the prime mover which provides two isolated d.c. outputs supplying charging currents for the batteries. However, as those in the art will also appreciate, reliable and effective practical achievement of such a system is complicated by the fact that the battery supplying the service load normally requires much higher charging currents than the auxiliary battery which is normally used only during operation of the starter motor and by the fact that these two unequal electrically isolated charging currents must be produced by a single alternator or generator structure since it is not considered desirable to mount two completely separate alternator structures on the prime mover.

One prior art attempt to achieve such a dual voltage supply system without the "series-parallel" switch is shown by U.S. Pat. No. 3,710,226 issued to Seike, Jan. 9, 1973. Here, the three-phase generating winding of a standard alternator has been reconnected such that only two phases are utilized for supplying charging current to the main battery and the third electrically isolated phase of the generating winding is output separately to supply charging current for the auxiliary battery. The usual voltage regulator is utilized for regulating the output voltage delivered to charge the main battery by regulating the current through a field winding of the alternator while a special solid state series regulator is utilized for controlling the output charging voltage delivered to the auxiliary battery. However, this prior art arrangement requires two separate voltage regulator circuits and, in addition, necessarily increases the ripple component of charging currents supplied to the two batteries since the main battery is only supplied by two phases and the auxiliary battery is supplied by but a single phase of the alternator generating windings.

Another prior art approach is shown by U.S. Pat. No. 3,816,805 issued to Terry on June 11, 1974. In this prior art approach, one phase of the three-phase electrical output from the alternator is also utilized to energize the primary winding of an isolation transformer while the secondary of the isolation transformer then provides an isolated source of a.c. output which is rectified in a single phase full wave rectifier and utilized for charging the auxiliary battery.

Still another prior art approach is shown by U.S. Pat. No. 3,793,544 issued to Baumgartner et al on Feb. 19, 1974. Here, the usual three-phase generating windings of the alternator have been duplicated to provide two electrically isolated but otherwise identical sets of generating windings in the same alternator structure. The two a.c. electrical outputs from these isolated generating windings are then individually rectified and utilized for supplying charging currents to the two serially connected batteries in the dual voltage system. However, Baumgartner, et al recognizes that one of the batteries will inherently require greater amounts of charging currents than the other thus spoiling the voltage regulation of the two output voltages from the system unless special precautions are taken. Baumgartner et al teaches such special precautions in the form of circuitry which attempts, insofar as possible, to maintain a balanced loading of both alternator generating windings. A special detector control circuitry is provided to detect any unbalanced loading of the multiple windings and, in response thereto, to actuate a relay coil and switching contacts which changes the current path for the service load and battery charging currents in an attempt to keep the system balanced sufficiently to permit operating with a single voltage regulator which controls a single field winding in the alternator. As will be appreciated, this approach involves the utilization of extra circuitry and, in addition, a special relay switching contact for switching potentially high currents in response to changes in the load balance.

Now, however, it has been discovered that the invention to be described below provides a simplified yet improved multiple voltage electrical supply system for such a dual voltage system which permits the batteries to remain connected permanently or continuously and, in addition, permits permanent or continuous individual charging connections to be maintained with both of the batteries while, at the same time, providing ample voltage regulation of both output voltages from the system with but a single voltage regulator circuit operating off one of the two outputs from the system to control the current through a field winding of a special alternator structure.

In essence, the invention to be described below approaches the general problem of the dual voltage system as described above from a different perspective than that of the known prior art as discussed above. For instance, this invention includes a special alternator structure having isolated sets of generating windings for supplying two electrically isolated a.c. outputs that are subsequently rectified to provide the necessary isolated d.c. outputs for charging the two serially connected batteries in the dual voltage system. However, rather than taking pains to equalize the loading of such multiple generating windings as attempted by Baumgartner et al, it is recognized at the outset that the two generating windings involved will be unequally loaded in normal operation. Recognizing and accepting this fact, the system of this invention is advantageously capable of making an advantage out of this feature to result in a properly voltage regulated system using only a single voltage regulator circuit which is nevertheless continuously connected for individually charging the plurality of battery supplies which are, in turn, continuously connected in series with one another to supply a plurality of load circuits having differing d.c. requirements. Since the load circuits in question normally have differing expected electrical power consumption rates, one of the supplies will normally be expected to draw less charging current than the other. Accordingly, under the teachings of this invention, the wire size of the generating winding included for supplying such a reduced charging current is made smaller than the other winding thus producing a higher internal winding resistance for this winding. Since the internal winding resistance is higher for the auxiliary winding, the internal voltage drop in the auxiliary winding can be made equal to the internal voltage of the main winding even though different average current levels are to be expected in the two windings. Accordingly, a single voltage regulator may still be utilized for effectively regulating the outputs of both generating windings even though there is no special detecting circuitry or relay switching contacts, etc., as proposed in the past for solving this problem.

The alternator structure utilized in the exemplary embodiment of this invention includes a stator means having salient poles of ferromagnetic material, a rotor means magnetically coupled and rotatably mounted with respect to the stator means and shaped so as to cause variations of magnetic flux within the salient poles in response to rotation thereof and a field winding mounted to generate magnetic flux in the rotor and stator means in response to electrical current flow therethrough. First and second generating windings are disposed upon the salient poles of the stator means with both the first and second windings being electrically isolated from one another. In the exemplary embodiment, the electrical conductor comprising the first generating winding has a certain characteristic resistance per unit length associated therewith while the electrical conductor associated with the second winding has a different and greater characteristic resistance per unit length. The first and second generating windings produce respectively corresponding first and second a.c. outputs therefrom in response to rotation of the rotor means due to the magnetic flux variations produced thereby.

The first and second generating windings of the stator means are disposed with respect to one another so as to insure that the magnetic flux linking the first generating winding bears a substantially constant ratio to the magnetic flux linking the second generating winding. In one of the preferred exemplary embodiments, this constant ratio is substantially one where both of the windings are similarly disposed three-phase generating windings. However, another exemplary embodiment is also disclosed wherein the first winding is a three-phase winding and the second generating winding is a single phase winding. In this case, the ratio flux linking the first generating winding to that flux which also links the second generating winding would be less than one but would nevertheless be a substantially constant ratio such that the voltage generated by flux changes within the rotor and stator means in the two generating coils would, similarly, bear a substantially constant ratio.

Since the second generating winding in the exemplary embodiment is formed of the second conductor material having a second and higher characteristic resistance per unit length than the first generating winding, it follows that an increased internal voltage drop is produced in the second winding as compared to the first winding for a given current flow thus, even though the second winding will be called upon to produce a lower expected charging current with the auxiliary battery, the voltage regulation of its charging current will compare quite favorably with the voltage regulation achieved in the first generating winding which has a lower internal resistance and a higher average current output.

This invention provides a multiple voltage electrical supply system for powering a number of d.c. loads having different voltage and/or load requirements. The system includes a number of battery supplies (each battery supply may itself comprise a plural combination of batteries such as, for instance, two twelve volt batteries connected in parallel or two six volt batteries connected in series, etc.) connected in series with one another to provide at their various terminals a number of different d.c. voltage levels which may oe tapped to power a number of d.c. loads of different voltage requirements. An alternator is provided having a number of electrically isolated sets of generating windings with each set producing a three-phase or other alternating current output voltage. A like number of rectifiers individually rectify the a.c. outputs of the respectively corresponding various sets of generating windings and each rectifier applies its d.c. output across a respectively associated one of the battery supplies. The alternator has a core of ferromagnetic material carrying the sets of generating windings. Each winding set is so mounted to the alternator core that a substantially constant ratio of the magnetic flux which passes through one winding set also passes through other corresponding winding sets with the result that the voltages which are induced in the sets of windings also bear a substantially constant ratio one to another. Accordingly, the d.c. output voltages from the various rectifiers retain the same ratio relative to one another despite changes in the load imposed on any one rectifier, the ratio being one-to-one in the case where each winding of one set has a corresponding winding or windings in the other set or sets and the windings of one set have the same number of turns as the windings of the other set to which it is compared. A voltage regulator senses the output voltage of one of the rectifiers and adjusts the excitation of a field coil to maintain the sensed output voltage at a desired pre-selected level. Because of the nature of the inductive coupling between the various sets of alternator windings and the substantially constant ratios mentioned above, the output of the other rectifier or rectifiers is automatically maintained substantially at its desired level through the regulation of the output of the first rectifier. This desired regulation is also enhanced by another feature of the invention, namely the inclusion of a higher internal winding resistance for the windings connected to supply the relatively lesser charging current.

Preferably, each winding of one set of windings and its corresponding winding or windings in the other set or sets of windings are wound on the core of the alternator in a bifilar, trifilar, quadrifilar or other multifilar manner, depending on the number of sets of windings involved, wherein the conductor of one winding and the conductor or conductors of the corresponding winding or windings run side-by-side with one another throughout the length of each winding. Further, the alternator is preferably an inductor alternator having salient poles on which the generating windings are received, the field coil, core and generating windings being fixed relative to one another and changes in the magnetic flux through the generating windings being produced by a ferromagnetic part rotated relative to the core. Also, the generating windings of the alternator are preferably of large diameter wire and few turns to reduce the voltage drop across each coil due to its impedance and the current flowing therethrough. However, if it is known that one winding will normally carry more current than its corresponding windings, the one carrying the smaller amount of current is preferably made of a smaller diameter to achieve a closer regulation of the voltages of the corresponding windings as explained above.

In a specific form, the invention resides in a high voltage start, lower voltage charge electrical system for a vehicle with a battery started internal combustion engine wherein two batteries are continuously connected in series with one another. A starter motor is connected across the series combination of the two batteries and a service load is connected across only one of the two batteries. The alternator has two sets of generating windings, the outputs of which are respectively rectified by two rectifiers, and the output of each rectifier is continuously connected and applied across a respective one of the two batteries.

As will now be appreciated, the invention provides a system having a minimum of complexity and in which two or more isolated and voltage regulated d.c. output voltages are respectively connected across two or more series connected batteries so that each of the batteries is charged individually upon individual demand. Further, the invention provides a system which eliminates expensive or failure prone components such as mechanical or solid state relays or switches and transformers. The mounting space required for these components is also eliminated. Further, the invention provides a multiple voltage electrical supply system wherein good regulation of a plurality of output d.c. voltages is obtained, despite differences in the values of the electrical loads served by such output voltages, and wherein only a single voltage regulator is required for such regulation.

It especially should be noted that although in the presently preferred and herein illustrated embodiment of the invention the system is a dual voltage system utilizing an alternator with two sets of windings, two rectifiers and two batteries, the invention is not necessarily limited to such a dual voltage situation and, instead, any larger number of d.c. output voltages may be accommodated by increasing the number of sets of alternator windings, the number of rectifiers and the number of batteries in accordance with the general teaching of this application.

These and other objects and advantages of the invention will be more completely understood from the following detailed description of the preferred embodiments and the accompanying drawings of which:

FIG. 1 is a schematic block diagram illustrating a complete electrical system embodying this invention and in combination with an internal combustion engine;

FIG. 2 is another schematic circuit diagram showing portions of the FIG. 1 diagram in more detail;

FIG. 4 is a fragmentary view generally similar to the right-hand portion of FIG. 3 showing how the system of FIG. 3 may be modified by the connection thereto of a second service load circuit;

FIG. 5 is a fragmentary perspective view showing the manner in which the windings of the alternator are wound on their poles in a bifilar manner.

FIG. 6 is a vertical longitudinal section view taken through the alternator of FIG. 1;

FIG. 7 is a vertical transverse sectional view taken on the line 7—7 of FIG. 6;

Figure 3:
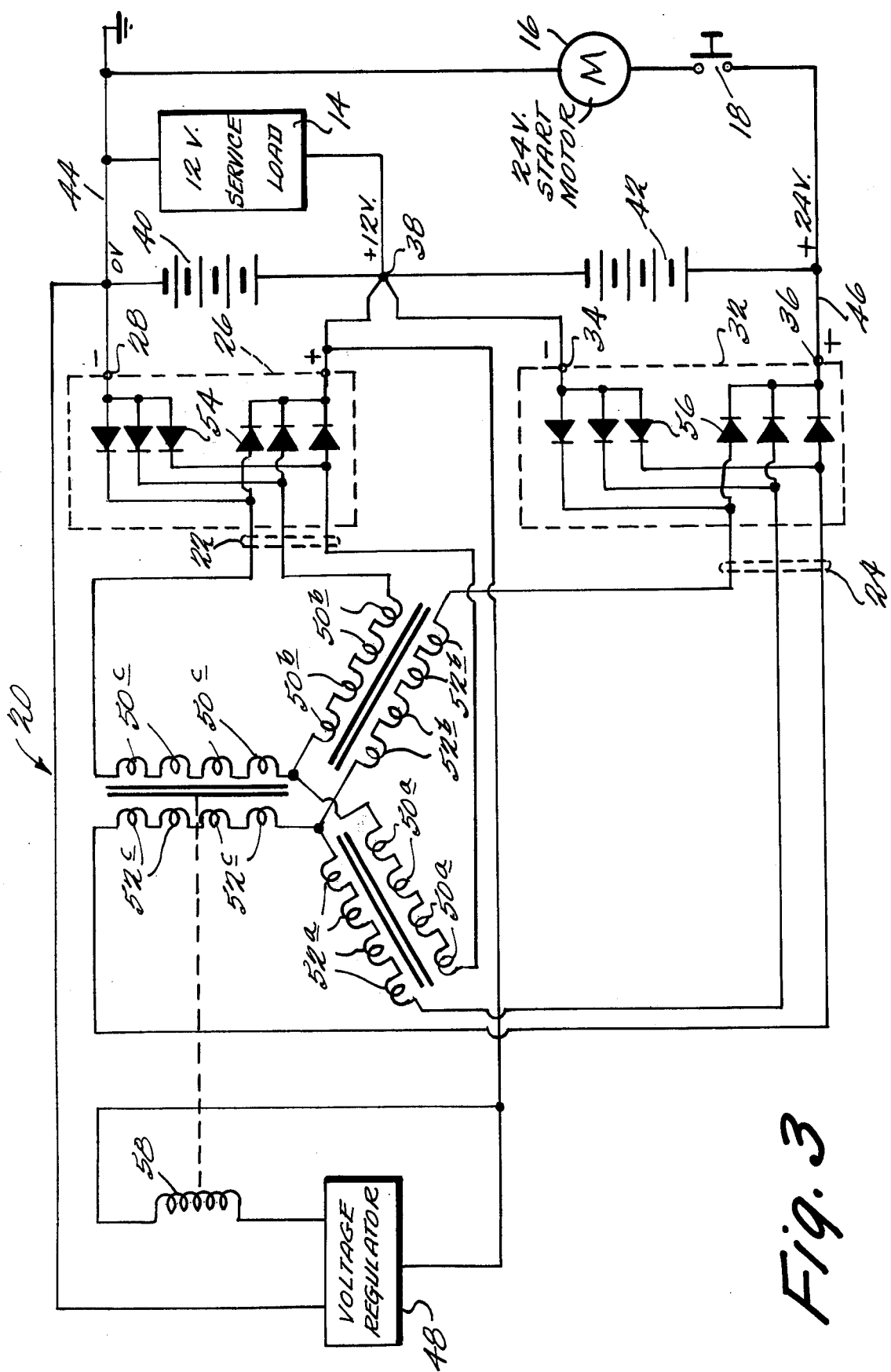
FIG. 3 is a schematic circuit diagram illustrating in even more detail part of the system shown in FIG. 1.

Referring to the drawings, FIG. 1 shows an electrical supply system, indicated generally at 10, embodying this invention and used in conjunction with an internal combustion engine 12, a service load 14 and a starter motor 16 controlled by a switch 18. In a common instance, the engine 12 may be that of a truck, bus or other large motor vehicle and the service load 14 may be a load circuit which includes all of the electrical components and accessories of the vehicle such as lights, etc., which are designed to require a standard d.c. supply voltage, commonly 12 volts. The starter motor 16, when energized, cranks the engine 12 for starting purposes and requires a higher supply voltage than the service load 14. In particular, the illustrated exemplary starter motor 16 is taken to be one designed for a 24 volt d.c. supply voltage.

The electrical supply system 10 of FIG. 1 includes an alternator 20 driven by the engine 12 when the engine is running. When driven, the alternator 20 produces two electrically isolated a.c. outputs appearing respectively on the lines 22 and 24. The a.c. output on the line 22 is rectified by a first rectifier 26 to produce a d.c. output voltage which appears across two output terminals 28 and 30 of the rectifier, the terminals 28 and 30 sometimes being referred to hereinafter as first and second terminals, respectively. Likewise, the a.c. output appearing on the line 24 is rectified by a second rectifier 32 to produce a second d.c. output voltage which appears across two output terminals 34 and 36 of the rectifier, the terminals 34 and 36 sometimes being hereinafter referred to as third and fourth terminals, respectively. The second terminal 30 and third terminal 34, which are of opposite polarity, are connected to a common point 38.

The supply system 10 also includes two battery supplies 40 and 42. Within the broader aspects of the invention, the two batteries may be of various different voltage ratings and/or battery combinations depending on the requirements of the service load and starter motor circuit with which they are used; but, in the illustrated case, each battery supply is taken to be a single twelve volt battery in keeping with the explanatory assumption that the service load is one requiring a twelve volt input and the starter motor one requiring a 24 volt input. The battery 40 has its positive terminal connected to the common point 38 and its negative terminal connected to the first rectifier terminal 28 through the line 44 which is also shown as being grounded to the vehicle chassis. The battery 42 has its negative terminal connected to the common point 38 and its positive terminal connected to the fourth rectifier terminal 36 through the line 46. As will be appreciated all the exemplary polarities (except for the field coil connection) would be reversed for a "positive ground" vehicular electrical system.

From the foregoing description together with a further study of FIG. 1, it will be observed that the service load 14 if connected across the battery 40 so as to be energized by the twelve volt d.c. voltage normally appearing across such battery, whereas the starter motor 16 is connected across the series combination of the two batteries 40 and 42 so as to be energized, when the starter motor switch 18 is closed, by the 24 volt d.c. voltage normally appearing across the two batteries. Also, the d.c. output voltage from the rectifier 26 is connected across only the first battery 40 and the d.c. output voltage from the rectifier 32 is connected across only the second battery 42. Therefore, the two batteries 40 and 42 are individually charged by the two rectifiers and, as will hereinafter become apparent, the load imposed on either one of the rectifiers has substantially no effect on the output of the other rectifier so that each battery is charged on an individual demand basis.

The output voltage of the first rectifier 26 is sensed by a voltage regulator 48 which conventionally controls the alternator 20 in such a manner as to keep the sensed voltage at a desired value. Preferably the regulator 48 also includes an a.c. input from the alternator so as to prevent the passage of field coil current unless the alternator rotor is being rotated. The output voltage of the second rectifier, due to the construction of the alternator 20, as hereinafter discussed, automatically follows the output voltage of the first rectifier so that when one output voltage is regulated, as by the regulator 48, the other output voltage is inherently regulated without another separate regulator being needed.

FIG. 2 is similar to FIG. 1 except that mechanical connections to the internal combustion engine 12 are not indicated and the internal electrical characteristics of the alternator 20 are depicted in more detail.

Here, a first generating winding is depicted by an internal voltage source $V_1$ and an internal winding resistance $R_1$ while a second generating winding is depicted by an internal voltage source $V_2$ and an internal winding resistance $R_2$. Internal reactive impedances for the windings are ignored for the present explanatory purposes since, in the preferred embodiment, both windings are magnetically linked with a coupling coefficient of substantially one thus effectively automatically equalizing the reactive components of inernal voltage drops in the two windings.

Since auxiliary battery 42 normally requires a relatively small charging current compared with the required charging current for battery 40, it follows that $I_2$ will be normally less than $I_1$. Thus, by properly choosing $R_2$ to be greater than $R_1$, the normally expected voltage regulation for the first and second windings can be closely matched despite the unequal loading thereof. As one possible example, providing acceptable dual regulation, the first winding may have three phases each formed from approximately No. 9 round copper wire while the second winding may have three corresponding phases each formed from approximately No. 20 round copper wire to provide a nominal load capacity of 30–40 amperes per phase for $I_1$ and 8–10 amperes per phase for $I_2$.

FIG. 3 shows in more detail an exemplary form of the electrical supply system of FIG. 1. Referring to FIG. 3, the alternator 20 is shown to be a three-phase alternator having one three-phase alternating current output appearing on three conductors comprising the line 22 of FIG. 1 and also having a second three-phase alternating current output appearing on three conductors constituting the line 24 of FIG. 1. One or both of these windings could be a single or other phase winding if three-phase operation is not deemed necessary or desirable for some reason. In any event, two separate alternating current outputs are produced by the two separate electrically isolated sets of generating windings in the alternator. In FIG. 3, the generating windings of one set are each indicated by the reference numeral 50 with the reference numeral having the subscript $a$, $b$ or $c$ added to indicate the phase group to which the winding belongs. That is, the windings 50a, 50a constitute a second phase group, and the windings 50c, 50c constitute a third phase group of the first set of generating windings. Likewise, the reference numeral 52 has been used to indicate each of the windings of the second set of generating windings with the subscripts $a$, $b$ and $c$ being added to indicate the phase group to which such windings belong. The number of windings in each set may vary without departing from the invention, but in the illustrated case, each set of windings includes twelve windings divided into three phase groups of four windings each group.

In the preferred exemplary embodiment, each winding 50 of the first set of windings has a corresponding winding 52 in the second set of windings. Further, each winding and its corresponding winding is so mounted on the flux carrying ferromagnetic core of the alternator that the magnetic flux which passes through any one winding also passes through its corresponding winding to produce an effective coupling coefficient of one. Other specific arrangements may also be utilized so long as the arrangement maintains a substantially constant ratio between flux linking one winding set and that linking another winding set. Thus, the voltage induced in any one winding by the varying flux is also induced in its corresponding winding (or a predetermined ratio thereof in the case of less than a unity coupling), provided each winding has the same number of turns. In the exemplary alternator of FIG. 3, the windings of each set are assumed to have the same number of turns as the corresponding windings of the other set so that the three-phase voltage applied to the rectifier 26 by the first set of windings over the line 22 corresponds almost exactly with the three-phase voltage supplied to the rectifier 32 over the line 24.

The rectifier 26 is preferably a full wave rectifier consisting, in the case of three-phase a.c., of six diodes 54, 54. The rectifier 32 is likewise preferably a full wave rectifier consisting, in the case of three-phase a.c., of six diodes 56, 56. The alternator 20 includes a field coil 58, the excitation of which is controlled by the regulator 48 to vary the total magnetic flux passing through parts of the alternator as required to maintain the d.c. output voltage of the first rectifier 26 at a desired constant value.

The actual construction of the alternator 20 may vary widely. It is, however, preferably a salient pole inductor alternator, and FIGS. 6 and 7 show one preferred form thereof. The inductor alternator shown by these figures is identical to the one shown and described in a copending commonly assigned U.S. Pat. application Ser. No. 360,908, filed May 16, 1973, except for each stator pole of the alternator receiving two generating windings rather than one generating winding. Another preferred exemplary embodiment for the salient pole inductor is described in detail in copending commonly assigned U.S. pat. application Ser. No. 522,294, filed Nov. 8, 1974. Reference may, therefore, be had to said copending applications for further details of the alternator construction. For the present, it is sufficient to note that the alternator 20, in FIGS. 6 and 7 consists of a stator structure made up of a frame or housing 60, an annular ferromagnetic stator core 62 having an annular series of stator poles 63, 63, and a field coil 58, the housing 60 having an annular cavity in which the field coil 58 and core 62 are received. A rotor 64, fixed to a shaft 66 and rotatable relative to the stator structue, includes an annular ferromagnetic rotor core 68 which is received in the annular space between the radially outwardly facing pole faces of the stator core poles 63, 63 and the radially inwardly facing housing surface 70 defining part of the housing cavity. The rotor core 68 includes a plurality of radially inwardly extending poles 72, 72 which cooperate with the stator poles 63, 63 as the rotor rotates, to cyclicly vary the amount of flux passing through each stator pole and to accordingly induce alternating voltages in the windings received on the stator poles.

In the alternator 20, each stator pole 63 receives one winding 50 of the first set of generating windings and a corresponding winding 52 of the second set of generating windings. In FIGS. 6 and 7 the windings 50 and 52 are shown in such a way as to suggest that each of the two windings on any given pole 63 is separate from the other with the windings being radially stacked on the pole. Such a construction may be used if desired. Preferably, however, the two windings 50 and 52 of each pole are wound in a bifilar manner as shown illustratively in FIG. 5.

Referring to FIG. 5, the winding 50 is formed of one conductor 74 and the winding 52 is formed of another conductor 76. The two conductors 74 and 76 are disposed directly adjacent to one another and run side-by-side throughout the length of each conductor. That is, in the winding process, the two conductors are laid side-by-side and wound simultaneously as if a single strand. Therefore, the two windings 50 and 52 are intimately associated with one another and the possibility of one winding experiencing a different flux change than the other winding, due for example to leakage of flux from the associated pole 63 at different points along the length of the pole, is substantially eliminated. In FIG. 5, each winding 50 and 52 is shown to constitute only a few number of turns but, of course, in actual practice each winding constitutes a far greater number of turns. Also, of course, each winding 50 and 52 is electrically insulated from one another as by a suitable insulating coating on each of the conductors 74 and 76 making up the windings. Still further, the conductor used for one set of generating windings 50, 50 is preferably of a different gauge and therefore of a different resistance per unit length than the conductor used for the other set of generating windings 52, 52 to suit different power requirements imposed on the two different sets of windings by the loads to which they are connected a described above.

Having now described in detail a dual voltage electrical supply system embodying the invention, with reference to FIGS. 1 to 7, its operation may be briefly summarized by noting that when the engine 12 and alternator 20 of FIG. 1 are stopped, the battery 40 supplied twelve volt d.c. electrical power to any components or accessories of the service load 14 as may be turned on. Also, when the starter motor 16 is energized to crank the engine 12, power is drawn from both of the batteries 40 and 42 which in series combination provide a 24 volt d.c. input to the motor. After the engine 12 is started and the alternator 20 driven at a normal operating speed, the rectifier 26 provides a d.c. output voltage which both charges the battery 40 and supplies the service load 14. The second rectifier 32 in turn produces a d.c. output voltage which charges the battery 42. The output voltages from both of the rectifiers are maintained at the desired voltage level by the voltage regulator 48 which senses only the output of the rectifier 26 but which nevertheless also regulates the output of the rectifier 32 due to the coupling of the two output voltages resulting from the bifilar or similar arrangement of the two sets of generating windings in the alternator 20 and/or the relative sizing of internal winding resistances and expected load currents as described above.

FIGS. 1–3 show only a single service load supplied by the illustrated dual voltage supply system. The system is not, however, limited to use with such a single service load and, if desired, a second service load, electrically isolated from the first service load may be attached to and supplied by the system. Such an arrangement is shown in FIG. 4 wherein the first load 14 is, as previously described, connected across the battery 40 and wherein a second service load 78 is connected across the second battery 42.

While only a few exemplary embodiments of this invention have been described in detail above, those in the art will recognize that many modifications and variations of the exemplary embodiments are possible without materially departing from the novel teachings and improvements of this invention. Accordingly, all such modifications and variations of the exemplary embodiments are intended to be included within the scope of this invention as defined by the appended claims.

What is claimed is:

1. A multiple voltage electrical supply system continuously connected for individually charging a plurality of battery supplies continuously connected in series with one another to supply a plurality of load circuits having differing d.c. input voltage requirements, said load circuits also having differing expected electrical power consumption rates such that one of said battery supplies is normally expected to draw less charging current than the other of said battery supplies, said system comprising:

an alternator structure including, a stator means having salient poles of ferromagnetic material, a rotor means magnetically coupled and rotably mounted with respect to said stator means and shaped so as to cause variations of magnetic flux within said salient poles in response to rotation thereof, a field winding mounted to generate magnetic flux in said rotor and stator means in response to electrical current flow in said field winding, a first generating winding disposed upon said salient poles of a first electrical conductor having a first characteristic resistance per unit length and producing a first a.c. output therefrom in response to rotation of said rotor means due to the magnetic flux variations produced thereby, a second generating winding electrically isolated from said first winding, said second winding also being disposed upon said salient poles so as to insure that the magnetic flux linking said first generating winding bears a substantially constant ratio to the magnetic flux linking said second generating winding, said second generating winding being formed of a second conductor having a second characteristic resistance per unit length greater than said first characteristic resistance per unit length thereby producing an increased internal voltage drop in said second winding as compared to said first winding for a given current flow, said second winding producing a second a.c. output therefrom in response to rotation of said rotor structure due to the magnetic flux variations produced thereby;

a first rectifier means continuously connected to said first generating winding and converting said first a.c. output into a corresponding first d.c. output which is, in turn, continuously connected to provide charging current to the said other of said battery supplies requiring the relatively greater expected charging current;

a second rectifier means continuously connected to said second generating winding and converting said second a.c. output into a corresponding second d.c. output which is, in turn, continuously connected to provide charging current to the said one of said battery supplies requiring the relatively smaller expected charging current; and a single voltage regulator connected to sense the voltage at one of said first and second d.c. outputs an also connected to control the current flow in said field winding so as to maintain the voltage at said selected one of the d.c. outputs at a desired level and thereby also substantially maintain the voltage at the remaining d.c. output at a corresponding desired voltage level as a result of the relatively greater expected current to be drawn from said first generating winding and the increased internal voltage drop in said second generating winding as compared to said first generating winding for a given current flow due to the increased internal winding resistance of said second generating winding as compared to said first generating winding.

2. A multiple voltage electrical supply system as in claim 1 wherein:

said first generating winding comprises a three-phase winding producing a three-phase first a.c. output;

said second generating winding comprises a single phase winding producing a single phase second a.c. output; said first rectifier means comprises a three-phase full wave rectifier; and said second rectifier means comprises a single phase full wave rectifier.

3. A multiple voltage electrical supply system as in claim 1 wherein:

said first and second generating means are each three-phase windings producing three-phase first and second a.c. outputs respectively; and said first and second rectifier means are each three-phase full wave rectifiers.

4. A multiple voltage electrical supply system for use with a plurality of load circuits having differing d.c. input voltage requirements, said system comprising:

an alternator having a plurality of sets of generating windings producing a corresponding plurality of a.c. output voltages, at least one of said sets of generating windings being formed of differently sized conductors than another of said sets of generating windings, a plurality of rectifiers, each continuously connected with a respective one of said sets of generating windings, for rectifying said plurality of a.c. output voltages into a corresponding plurality of d.c. voltages, a plurality of batteries continuously connected in series with one another, each of said batteries having two terminals, a plurality of load circuits continuously connected across different pairs of said terminals of said series connected batteries so as to receive different d.c. voltages from said batteries, conductor means continuously connecting each of said plurality of d.c. voltages from said plurality of rectifiers across two respectively associated terminals of an individual respectively associated one of said batteries, said alternator having a magnetic flux conducting ferromagnetic core carrying said sets of generating windings and also having a field coil, the degree of excitation of which controls the total amount of magnetic flux passing through said core and the amplitude of the a.c. voltages induced in the windings of said sets of windings, said windings being mounted on said core in such a manner that a substantially constant ratio of magnetic flux magnetically links each of the sets of windings when compared to one another, and a single voltage regulator means responsive to the electrical output from a corresponding single one of said sets of generating windings for controlling the excitation of said field coil and maintaining the electrical output voltages from all of said sets of generating windings at substantially constant values without changing any electrical interconnections between said winding, rectifiers, batteries or load circuits the relative construction, size and disposition of said sets of generating windings being effective to automatically maintain substantially constant output voltages from all sets of generating windings in response to regulation from said single voltage regulator means while, at the same time, automatically varying the charging current produced from said sets of generating windings as required by the respectively corresponding connected batteries.

5. A multiple voltage electrical supply system as defined in claim 4 further characterized by each winding of one of said sets having a corresponding winding in each of the other sets and said ferromagnetic core of said alternator including a plurality of salient poles, corresponding windings of said sets of generating windings being mounted on the same one of said salient poles.

6. A dual voltage electrical system comprising:
an alternator having a first set of generating windings producing a first a.c. output voltage and also having a second set of generating windings electrically isolated from said first set of windings and producing a second a.c. output voltage:
said first set of generating windings being formed of differently sized conductors than said second set of generating windings,
a first rectifier for rectifying said first a.c. output voltage into a first d.c. voltage, said first rectifier having first and second output terminals across which said first d.c. voltage appears,
a second rectifier for rectifying said second a.c. output voltage into a second d.c. voltage, said second rectifier having third and fourth output terminals across which said second d.c. voltage appears,
said second and third terminals being of opposite polarity,
conductor means electrically connecting said second and third terminals to one another continuously at a common point,
a first battery continuously connected between said first terminal and said common point,
a second battery continuously connected between said common point and said fourth terminal,
a service load circuit connected across said first terminal and said common point so as to be in parallel with said first battery,
a second load circuit requiring a higher input voltage than said service load circuit connected across said first and fourth terminals so as to be connected in parallel with the series combination of said two batteries,
said alternator having a magnetic flux conducting ferromagnetic core carrying said first and second sets of generating windings and also having a field coil,
each winding of one of said sets having a corresponding winding in the other of said sets and each winding and its corresponding winding being mounted on said core in such a manner that substantially all of the magnetic flux which passes through any one winding also passes through its corresponding winding and so that the voltage induced in one winding has a fixed ratio to the voltage induced in its corresponding winding, and
a single voltage regulator responsive to the d.c. output voltage appearing across the two output terminals of one of said two rectifiers for controlling the excitation of said field coil to maintain said latter d.c. output voltage at a substantially constant value the relative construction, size and disposition of said sets of generating windings being effective to automatically maintain substantially constant output voltages from all sets of generating windings in response to regulation from said single voltage regulator means while, at the same time, automatically varying the charging current produced from said sets of generating windings as required by the respectively corresponding connected batteries.

7. A dual voltage electrical system as defined in claim 6 further characterized by said core having a plurality of salient poles each of which receives one of said windings of said first set of generating windings and its corresponding winding of said second set.

8. A dual voltage electrical system as defined in claim 6 further characterized by an internal combustion engine for driving said alternator, an electrical starter motor for starting said engine, and at least one electrically powered accessory associated with said engine, said accessory comprising at least a part of said service load circuit and said starter motor comprising at least a part of said second load circuit.

9. A multiple voltage electrical supply system for use with a plurality of load circuits having differing d.c. input voltage requirements, said system comprising:
an alternator having a plurality of sets of generating windings producing a corresponding plurality of a.c. output voltages,
a plurality of rectifiers, each continuously connected with a respective one of said sets of generating windings, for rectifying said plurality of a.c. output voltages into a corresponding plurality of d.c. voltages,
a plurality of batteries continuously connected in series with one another, each of said batteries having two terminals,
a plurality of load circuits continuously connected across different pairs of said terminals of said series connected batteries so as to receive different d.c. voltages from said batteries,
conductor means continuously connecting each of said plurality of d.c. voltages from said plurality of rectifiers across two respectively associated terminals of an individual respectively associated one of said batteries,
said alternator having a magnetic flux conducting ferromagnetic core carrying said sets of generating windings and also having a field coil, the degree of excitation of which controls the total amount of magnetic flux passing through said core and the amplitude of the a.c. voltages induced in the windings of said sets of windings,
said windings being mounted on said core in such a manner that a substantially constant ratio of magnetic flux magnetically links the sets of windings,
a single voltage regulator means responsive to the electrical output from a corresponding single one of said sets of generating windings for controlling the excitation of said field coil and maintaining the electrical output voltages from all of said sets of generating windings at substantially constant values without changing any electrical interconnections between said windings, rectifiers, batteries or load circuits,
each winding of one of said sets having a corresponding winding in each of the other sets and said ferromagnetic core of said alternator including a plurality of salient poles, corresponding windings of said sets of generating windings being mounted on the same one of said salient poles, and said alternator being an inductor alternator wherein said field coil, said core and said sets of generating windings are stationary relative to one another, said inductor alternator including a part of ferromagnetic material rotatable relative to said core for varying the reluctance of the flux paths through said salient poles of said core to in turn vary the amount of flux passing through said salient poles and the voltages induced in the windings on said poles.

10. A multiple voltage electrical supply system for use with a plurality of load circuits having differing d.c. input voltage requirements, said system comprising:

an alternator having a plurality of sets of generating windings producing a corresponding plurality of a.c. output voltages, a plurality of rectifiers, each continuously connected with a respective one of said sets of generating windings, for rectifying said plurality of a.c. output voltages into a corresponding plurality of d.c. voltages, a plurality of batteries continuously connected in series with one another, each of said batteries having two terminals, a plurality of load circuits continuously connected across different pair of said terminals of said series connected batteries so as to receive different d.c. voltages from said batteries, conductor means continuously connecting each of said plurality of d.c. voltages from said plurality of rectifiers across two respectively associated terminals of an individual respectively associated one of said batteries, said alternator having a magnetic flux conducting ferromagnetic core carrying said sets of generating windings and also having a field coil, the degree of excitation of which controls the total amount of magnetic flux passing through said core and the amplitude of the a.c. voltages induced in the windings of said set of windings, said windings being mounted on said core in such a manner that a substantially constant ratio of magnetic flux magnetically links the sets of windings, a single voltage regulator means responsive to the electrical output from a corresponding single one of said sets of generating windings for controlling the excitation of said field coil and maintaining the electrical output voltages from all of said sets of generating windings at substantially constant values without changing any electrical interconnections between said windings, rectifiers, batteries or load circuits, each winding of one of said sets having a corresponding winding in each of the other sets and said ferromagnetic core of said alternator including a plurality of salient poles, corresponding windings of said sets of generating windings being mounted on the same one of said salient poles, and said corresponding windings of said sets being wound in multifilar relationship with one another.

11. A multiple voltage electrical supply system for use with a plurality of load circuits having differing d.c. input voltage requirements, said system comprising:

an alternator having a plurality of sets of generating windings producing a corresponding plurality of a.c. output voltages, a plurality of rectifiers, each continuously connected with a respective one of said sets of generating windings, for rectifying said plurality of a.c. output voltages into a corresponding plurality of d.c. voltages, a plurality of batteries continuously connected in series with one another, each of said batteries having two terminals, a plurality of load circuits continuously connected across different pairs of said terminals of said series connected batteries so as to receive different d.c. voltages from said batteries, conductor means continuously connecting each of said plurality of d.c. voltages from said plurality of rectifiers across two respectively associated terminals of an individual respctively associated one of said batteries, said alternator having a magnetic flux conducting ferromagnetic core carrying said sets of generating windings and also having a field coil, the degree of excitation of which controls the total amount of magnetic flux passing through said core and the amplitude of the a.c. voltages induced in the windings of said sets of windings, said windings being mounted on said core in such a manner that a substantially constant ratio of magnetic flux magnetically links the sets of windings, a single voltage regulator means responsive to the electrical output from a corresponding single one of said sets of generating windings for controlling the excitation of said field coil and maintaining the electrical output voltages from all of said sets of generating windings at substantially constant values without changing any electrical interconnections between said windings, rectifiers, batteries or load circuits, each winding of one of said sets having a corresponding winding in each of the other sets and said ferromagnetic core of said alternator including a plurality of salient poles, corresponding windings of said sets of generating windings being mounted on the same one of said salient poles, and each of said sets of generating windings including three groups of windings in which electrical voltages of different phases are induced, the three groups of windings of each set being connected to one another to produce a three-phase a.c. output voltage, and each of said rectifiers being a three-phase rectifier for rectifying the three-phase a.c. voltage from the associated set of generating windings into a d.c. voltage.

12. A dual voltage electrical system comprising: an alternator having a first set of generating windings producing a first a.c. output voltage and also having a second set of generating windings electrically isolated from said first set of windings and producing a second a.c. output voltage, a first rectifier for rectifying said first a.c. output voltage into a first d.c. voltage, said first rectifier having first and second output terminals across which said first d.c. voltage appears, a second rectifier for rectifying said second a.c. output voltage into a second d.c. voltage, said second rectifier having third and fourth output terminals across which said second d.c. voltage appears, said second and third terminals being of opposite polarity, conductor means electrically connecting said second and third terminals to one another continuously at a common point, a first battery continuously connected between said first terminal and said common point, a second battery continuously connected between said common point and said fourth terminal, a service load circuit connected across said first terminal and said common point so as to be in parallel with said first battery, a second load circuit requiring a higher input voltage than said service load circuit connected across said first and fourth terminals so as to be connected in parallel with the series combination of said two batteries, said alternator having a magnetic flux conducting ferromagnetic core carrying said first and second sets of generating windings and also having a field coil, each winding of one of said sets having a corresponding winding in the other of said sets and each winding and its corresponding winding being mounted on said core in such a manner that substantially all of the magnetic flux which passes through any one winding also passes through its corresponding winding and so that the voltage induced in one winding has a fixed ratio to the voltage induced in its corresponding winding, and a single voltage regulator responsive to the d.c. output voltage appearing across the two output terminals of one of said two rectifiers for controlling the excitation of said field coil to maintain said latter d.c. output voltage at a substantially constant value, said windings of said first set windings being in bifilar relationship with the corresponding windings of said second set of windings.

13. A dual voltage electrical system comprising:

an alternator having a first set of generating windings producing a first a.c. output voltage and also having a second set of generating windings electrically isolated from said first set of windings and producing a second a.c. output voltage, a first rectifier for rectifying said first a.c. output voltage into a first d.c. voltage, said first rectifier having first and second output terminals across which said first d.c. voltage appears, a second rectifier for rectifying said second a.c. output voltage into a second d.c. voltage, said second rectifier having third and fourth output terminals across which said second d.c. voltage appears, said second and third terminals being of opposite polarity, conductor means electrically connecting said second and third terminals to one another continuously at a common point, a first battery continuously connected between said first terminal and said common point, a second battery continuously connected between said common point and said fourth terminal, a service load circuit connected across said first terminal and said common point so as to be in parallel with said first battery, a second load circuit requiring a higher input voltage than said service load circuit connected across said first and fourth terminals so as to be connected in parallel with the series combination of said two batteries, said alternator having a magnetic flux conducting ferromagnetic core carrying said first and second sets of generating windings and also having a field coil, each winding of one of said sets having a corresponding winding in the other of said sets and each winding and its corresponding winding being mounted on said core in such a manner that substantially all of the magnetic flux which passes through any one winding also passes through its corresponding winding and so that the voltage induced in one winding has a fixed ratio to the voltage induced in its corresponding winding, and a single voltage regulator responsive to the d.c. output voltage appearing across the two output terminals of one of said two rectifiers for controlling excitation of said field coil to maintain said latter d.c. output voltage at a substantially constant value, said alternator being an inductor alternator wherein said ferromagnetic core, said field coil and said two sets of generating windings are fixed relative to one another and wherein changes in the magnetic flux passing through said two sets of generating windings on said ferromagnetic core are produced by a ferromagnetic part rotatable relative to said core.

14. A dual voltage electrical system comprising:

an alternator having a first set of generating windings producing a first a.c. output voltage and also having a second set of generating windings electrically isolated from said first set of windings and producing a second a.c. output voltage, a first rectifier for rectifying said first a.c. output voltage into a first d.c. voltage, said first rectifier having first and second output terminals across which said first d.c. voltage appears, a second rectifier for rectifying said second a.c. output voltage into a second d.c. voltage, said second rectifier having third and fourth output terminals across which said second d.c. voltage appears, said second and third terminals being of opposite polarity, conductor means electrically connecting said second and third terminals to one another continuously at a common point, a first battery continuously connected between said first terminal and said common point, a second battery continuously connected between said common point and said fourth terminal, a service load circuit connected across said first terminal and said common point so as to be in parallel with said first battery, a second load circuit requiring a higher input voltage than said service load circuit connected across said first and fourth terminals so as to be connected in parallel with the series combination of said two batteries, said alternator having a magnetic flux conducting ferromagnetic core carrying said first and second sets of generating windings and also having a field coil, each winding of one of said sets having a corresponding winding in the other of said sets and each winding and its corresponding winding being mounted on said core in such a manner that substantially all of the magnetic flux which passes through any one winding also passes through its corresponding winding and so that the voltage induced in one winding has a fixed ratio to the voltage induced in its corresponding winding, a single voltage regulator responsive to the d.c. output voltage appearing across the two output terminals of one of said two rectifiers for controlling the excitation of said field coil to maintain said latter d.c. output voltage at a substantially constant value, and said first set of windings being made of conductor having a smaller resistance per unit length than the conductor comprising said second set of windings.

* * * * *